US006284549B1

(12) United States Patent
Guthrie

(10) Patent No.: US 6,284,549 B1
(45) Date of Patent: Sep. 4, 2001

(54) REAGENT TUBE VENTING SYSTEM AND METHOD

(75) Inventor: Robert Guthrie, Ventura, CA (US)

(73) Assignee: Ventrex, Inc., CA (US)

( * ) Notice: Subject to any disclaimer, the term of this patent is extended or adjusted under 35 U.S.C. 154(b) by 0 days.

(21) Appl. No.: 09/320,237

(22) Filed: May 26, 1999

(51) Int. Cl.$^{7}$ .............................. B01L 3/02; B01L 11/00; B67D 3/00; F16L 51/00; E03B 1/00

(52) U.S. Cl. .......................... 436/180; 422/100; 422/103; 222/544; 137/197; 137/318; 137/339; 137/342

(58) Field of Search .................................... 422/100, 103; 222/544, 5, 81, 82; 137/637, 318, 342, 339, 197; 29/213.1; 251/213; 206/219; 436/180

(56) References Cited

U.S. PATENT DOCUMENTS

| | | | | |
|---|---|---|---|---|
| 3,269,664 | * | 8/1966 | Lamb et al. | 239/272 |
| 3,290,017 | | 12/1966 | Davies et al. | 259/114 |
| 3,811,326 | * | 5/1974 | Sokol | 73/425.4 P |
| 4,364,474 | | 12/1982 | Hollander, Jr. | 206/219 |
| 4,632,244 | | 12/1986 | Landau | 206/219 |
| 4,808,381 | * | 2/1989 | McGregor et al. | 422/100 |
| 5,067,051 | | 11/1991 | Ladyjensky | 362/34 |
| 5,105,844 | * | 4/1992 | King, Sr. | 137/15 |
| 5,163,582 | * | 11/1992 | Godolphin et al. | 222/1 |
| 5,270,219 | * | 12/1993 | DeCastro et al. | 436/180 |
| 5,354,537 | * | 10/1994 | Moreno | 422/100 |
| 5,403,622 | | 4/1995 | Nishi et al. | 427/356 |
| 5,508,893 | | 4/1996 | Nowak et al. | 362/34 |
| 5,552,968 | | 9/1996 | Ladyjensky | 362/34 |
| 5,855,223 | * | 1/1999 | Halonen | 137/318 |
| 6,054,326 | * | 4/2000 | Dubus | 436/180 |
| 6,135,325 | * | 10/2000 | Fessel et al. | 222/309 |

* cited by examiner

*Primary Examiner*—Jill Warden
*Assistant Examiner*—Brian R Gordon
(74) *Attorney, Agent, or Firm*—Fulwider Patton Lee & Utecht, LLP

(57) ABSTRACT

In a system and method for venting trapped gas from a reagent chamber in a reagent tube system and method, the system includes a valve insertion tool for inserting a valve in the tube so as to seal the chamber and enclose a reagent therein, and so as to vent trapped gas from the chamber. The system further includes a tube and valves comprised of materials for enabling momentary deflection of the valves for insertion in the tube. The tube and valve materials further enable the valve to remain in place to obstruct the flow of reagent from one chamber to the next upon insertion in the tube. They are further adapted to be readily displaceable with minimal focused force when separate dispensing or interaction and intermixing of the reagents is required for use thereof.

50 Claims, 2 Drawing Sheets

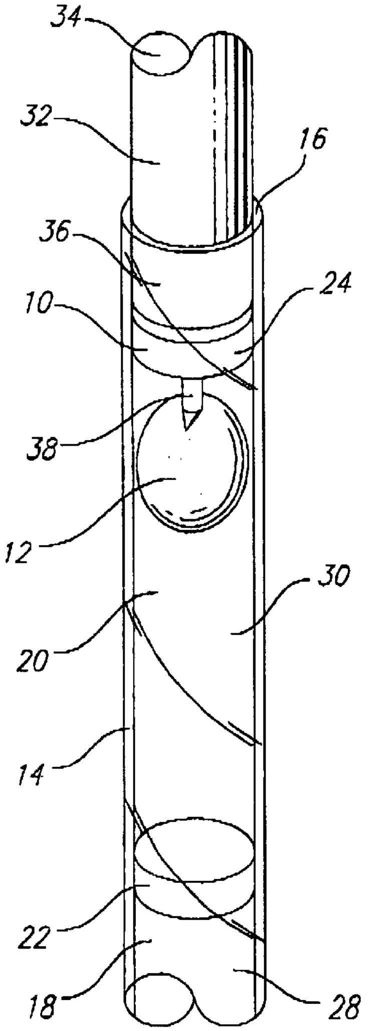
FIG. 1
FIG. 2
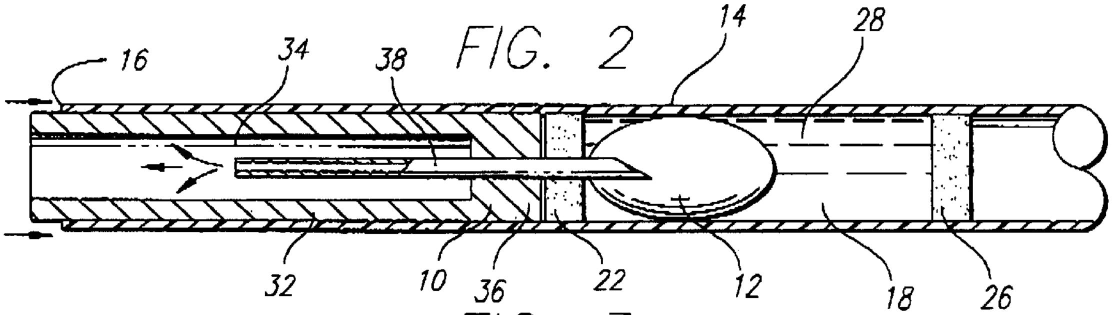
FIG. 3
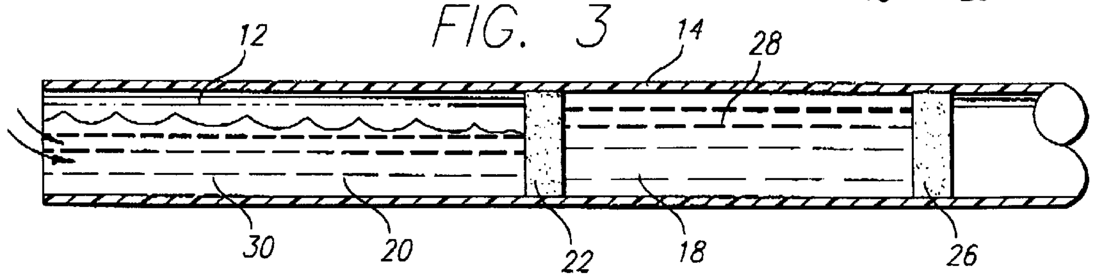

REAGENT TUBE VENTING SYSTEM AND METHOD

BACKGROUND OF THE INVENTION

1. Field of the Invention

This invention relates generally to improvements in reagent tube systems and methods, and, more particularly, to a new and improved system and method for venting gas trapped in a reagent tube during insertion of chamber-forming valves therein.

2. Description of the Related Art

It has been known to form chambers for reagents in a tube, wherein the reagent chambers are formed by valves inserted in the tube. The valves are adapted to be displaced upon the application of sufficient force to the tube, such that the reagents may be separately dispensed for use of each reagent, or intermixed to interact so as to enable use of a reagent mixture formed thereby. The valves are inserted in the tube through the use of a valve insertion tool, so as to seal the reagents in the chambers until intended displacement of the valves takes place.

However, in inserting the valves in the tube, gas such as air or nitrogen used during the reagent filling process may be trapped and compressed in the reagent chamber. The compression of the trapped gas in the reagent chamber may cause the valve to leak or to be internally stressed such that the seal created by the valve is unstable.

Further, it has been known to provide a tube which is comprised of an elastic material, and to provide a valve which is comprised of a rigid material. However, the elastic properties of the tube tend to make it more difficult to deflect the valve. An elastic tube such as for example silicone, thermoplastic elastomer, or urethane is much more costly than a tube made from a more rigid material such as polypropylene. Further, the use of pliable tube materials which do not exhibit good elasticity such as polyvinylchloride is not optimal. Such materials stretch to accommodate the valve. Initially, a reasonable seal is obtained, but without good elasticity, the material tends to take a new set. Any increase in internal pressure, through thermal expansion, shock, or the like, may cause the valves to leak. Also, the rigid properties of the valves make them more expensive to manufacture, requiring slower operations such as punching, sawing, or molding. Punching results in a ragged perimeter, a compromised seal, and considerable material waste.

Therefore, those concerned with the development and use of improved reagent systems and methods and the like have recognized the need for improved systems and methods for venting the compressed trapped gas from the reagent chambers to prevent valve leakage and seal instability. Further, the need has been recognized for more effective materials for the tube and the valve, for enabling the valve to momentarily deform in the tube, but remain as an obstruction to the flow of reagents from one chamber to the next, until displacement is required, whereupon the valve is displaced with minimal focused force.

Accordingly, the present invention fulfills these needs by providing efficient and effective systems and methods for inserting valves in reagent tubes so as to seal the reagents in the chambers and vent trapped gas from the chambers, for preventing valve leakage, providing seal stability, and enabling valve displacement when desired without obstructing the flow of reagent after valve displacement.

SUMMARY OF THE INVENTION

Briefly, and in general terms, the present invention provides a new and improved system and method for inserting chamber-sealing valves in reagent tubes in an efficient and effective manner so as to vent compressed trapped gas from the reagent chambers. The system provides enhanced sealing of the reagents in the chambers and prevents leakage of reagents from the chambers. The system also provides a tube and valves comprised of materials adapted to enable efficient insertion and retention of the valve in the tube, and to enable effective displacement of the valves for separate dispensing or intermixing of the reagents for use thereof.

By way of example, and not by way of limitation, the present invention provides a new and improved system for enabling the venting of gas trapped in a reagent tube, upon insertion of a valve for forming a chamber therein. Each chamber may be adapted to contain one of a plurality of reagents therein. The plurality of reagents in the plurality of chambers may be adapted to be separately dispensed or mixed to interact, subsequent to being sealed in the chambers, upon displacement of the valve.

More particularly, the present invention may include a tube for separately containing a plurality of reagents therein. The tube may enable the separate dispensing or mixing of the plurality of reagents therein upon displacement of the valve in the tube. The tube may include a closed end and an open end. It includes a first chamber, for sealing a first reagent therein pending separate dispensing or mixing of the plurality of reagents. The first chamber may be formed upon inserting a first valve at one end thereof. The tube may further include a second chamber, adjacent to the first chamber, for containing a second reagent therein. The second chamber may include the first valve at one end thereof, and may be formed upon inserting a second valve at the other end thereof, for sealing the second reagent therein pending separate dispensing or mixing of the plurality of reagents. The present invention further includes means for inserting the first and/or second valves in the tube, so as to seal the chambers and enclose the reagents therein, and so as to vent compressed gas which may be trapped in the chambers upon insertion of the valves therein.

The system, in accordance with the present invention, includes one embodiment of a valve insertion tool which is adapted to fully penetrate the valve and vent the trapped gas, and the valve material is adapted to reseal the opening caused by insertion of the tool. The tool may further be adapted to enable the filling of a chamber with a reagent therethrough.

The system also includes a further embodiment of the valve insertion tool which is adapted to promote the venting of the trapped gas therearound during insertion of the valve, while preventing leaking of the reagent.

The system of the present invention also includes another embodiment of the valve insertion tool which is adapted to expand the outside diameter of the tube during insertion of the valve to enable the venting of the trapped gas thereabout.

The system, in accordance with the present invention, also includes a further embodiment of the valve insertion tool which is adapted to support a portion of the valve upon insertion thereof, to enable the venting of trapped gas through the unsupported valve portion.

The system of the present invention also includes a tube and valves comprised of materials which are adapted to enable the valve to momentarily deform upon insertion thereof in the tube, to remain in place as an obstruction to the flow of reagents between chambers, and to be displaceable for intermixing of reagents when required for use.

Therefore one advantage of the present invention is that it includes an improved reagent system and method for enabling trapped gas to be vented from the reagent chamber, to prevent valve leakage and seal instability.

A further advantage is that the present invention provides a tube and valves comprised of materials for enabling momentary deflection of the valves for insertion in the tube, while remaining in place upon insertion therein to obstruct the flow of reagent from one chamber to the next, and being readily displaceable with minimal focused force when required for separate dispensing or intermixing and interaction of the reagents for use thereof.

These and other objects and advantages of the invention will become apparent from the following more detailed description, when taken in conjunction with the accompanying drawings of illustrative embodiments.

BRIEF DESCRIPTION OF THE DRAWINGS

FIG. 1 is a perspective partly-broken view of a reagent mixing tube, a valve insertion tool inserted therein, and the venting of gas from the reagent chamber, in a first embodiment in accordance with the present invention;

FIG. 2 is a side elevational partly-broken partly-sectional view of the insertion of a first valve in the reagent mixing tube, and the venting of gas from the reagent chamber, in the first embodiment in the practice of the invention;

FIG. 3 is a similar view of a reagent being inserted in a second chamber of the reagent mixing tube, in the first embodiment of the invention;

DETAILED DESCRIPTION OF THE PREFERRED EMBODIMENTS

Figure 4:
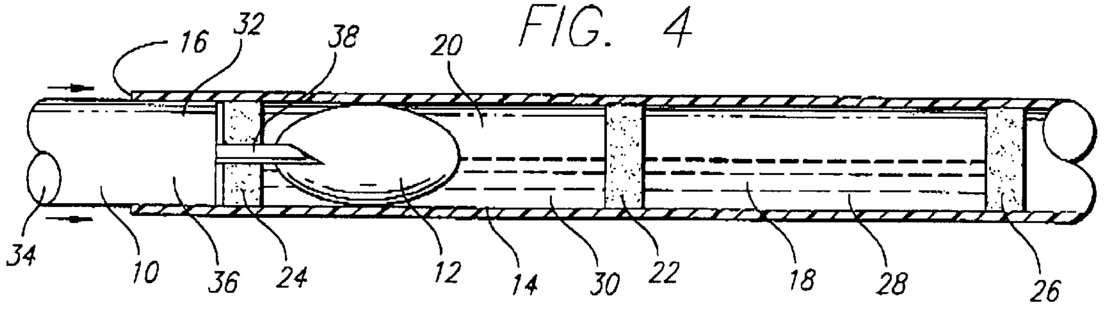
FIG. 4 is a similar view of the insertion of the valve insertion tool in the reagent mixing tube, and the venting of gas from the reagent chamber, in the first embodiment of the invention.

The present invention is directed to an improved system and method for enabling the venting of compressed gas which is trapped in a reagent tube during insertion of the valve therein, in an efficient and effective manner. The improved system and method provides effective and efficient tools for insertion of the valves, and methods of insertion of the valves. The preferred embodiments of the improved system and method are illustrated and described herein by way of example only and not by way of limitation.

Referring now to the drawings, wherein like reference numerals denote like or corresponding parts throughout the drawing figures, and particularly to FIGS. 1–7, a system 10 is provided for enabling the venting of the compressed gas 12 trapped in a tube 14 upon insertion of a valve therein. The tube 14 may include a closed or open first end (not shown) and a second open end 16. It is adapted to enable a plurality of chambers to be formed therein, such as for example a first chamber 18 and a second chamber 20. It is preferably comprised of a relatively rigid material, and includes walls which are substantially thin relative to the diameter of the tube 14. The material of which the tube 14 is comprised preferably comprises polypropylene, burate, or polyethylene. The tube 14 is arranged substantially vertical.

Each chamber in the tube 14 is adapted to be formed by at least one valve located in at least one end thereof, such as for example a first valve 22 at one end of the first chamber 18. A second valve 24 is located at the opposite end of the second chamber 20. The first valve 22 and the second valve 24 are preferably comprised of a material comprising a moderate durometer, such as 85 Shore A. The moderate durometer of the valves allows the valve thickness to be minimized, enabling the valves to be displaced with minimal focused force. The stiffness of the moderate durometer material makes the valve more likely to gate open, enabling the valve to be displaced and not remain as an obstruction to the flow of the reagents from one chamber to another. Where the first end of the tube 14 is closed, the closed end of the tube 14 forms the opposite end of the first chamber 18. Where the first end of the tube 14 is open, a third valve 26 is located at the opposite end of the first chamber 18 in the embodiments shown in FIGS. 2–8.

Each chamber in the tube 14 is further adapted to contain one of a plurality of reagents therein, such as for example a first reagent 28 in the first chamber 18, and a second reagent 30 in the second chamber 20. The plurality of reagents are adapted to be separately dispensed or mixed so as to interact, subsequent to being inserted and sealed in each separate chamber, upon displacement of the valves in the tube, as by pressing the sides of the tube sufficiently to displace the valves.

The system 10 of the present invention may further include one of a plurality of valve insertion tools, each of which is adapted to enable the venting of the compressed gas 12 trapped in the tube 14 upon insertion of a valve therein.

As illustrated in FIGS. 1–4, a first embodiment of the valve insertion tool comprises a first tool 32. The first tool 32 includes a hollow shaft portion 34, a head portion 36, and a hollow needle portion 38 projecting from the head portion 36. As shown in FIGS. 1–2, the hollow needle portion 38 is adapted to project beyond the head portion 36 sufficiently with respect to the first chamber 18 to fully penetrate the first valve 22 and vent the trapped gas 12. As seen in FIG. 4, the hollow needle portion 38 is also adapted to fully penetrate the second valve 24 and vent the trapped gas 12. The elastic material of which the first valve 22 and the second valve 24 are comprised is adapted to reseal the opening formed therein by insertion of the hollow needle portion 38, upon removal of the hollow needle portion 38. In a further configuration (not shown) of this first embodiment of the valve insertion tool, the first tool 32 includes a further hollow shaft portion and a further hollow needle portion, projecting from the head portion 36 and separate from the hollow shaft portion 34 and the hollow needle portion 38, for enabling the filling of a chamber with a reagent therethrough.

Figure 5:
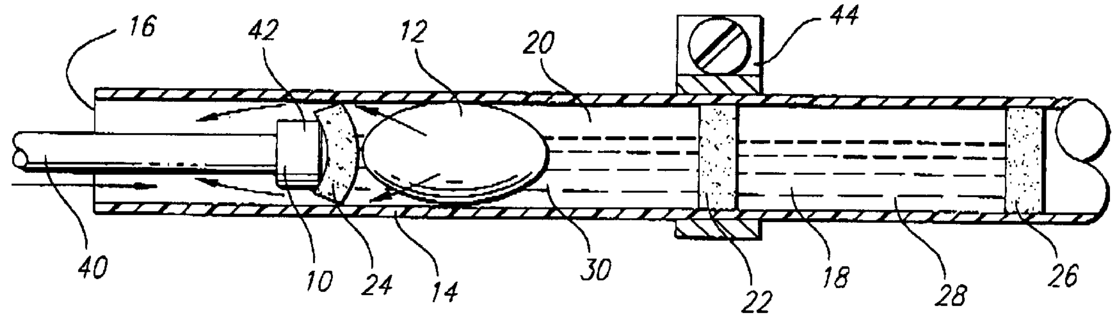
FIG. 5 is a similar view of the insertion of a valve insertion tool in the reagent mixing tube, and the venting of gas from the reagent chamber, in a second embodiment of the invention.

As shown in FIG. 5, a second embodiment of the valve insertion tool comprises a second tool 40, including a head portion 42 reduced in size relative to the size of the valve, adapted to promote the venting of the trapped gas 12 around the valve during insertion thereof. A clamp 44 is secured about the first valve 22, for clamping the perimeter of the first valve 22 about the contact surface interface thereof, to prevent leaking therethrough of the second reagent 30.

Figure 6:
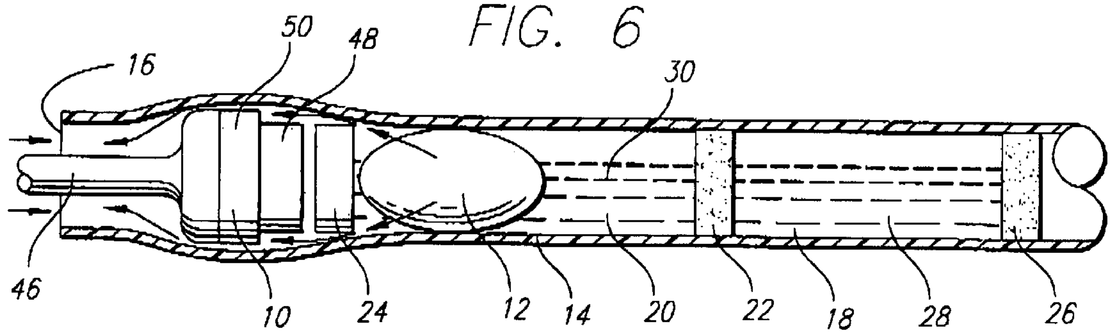
FIG. 6 is a similar view of the insertion of a valve insertion tool in the reagent mixing tube, and the venting of gas from the reagent chamber, in a third embodiment of the invention.

Referring to FIG. 6, a third embodiment of the valve insertion tool comprises a third tool 46. The third tool 46 includes a head portion 48 which includes an enlarged portion 50 adapted to be wider than the outside diameter of the tube 14, to enable the venting of the trapped air 12 thereabout.

Figure 7:
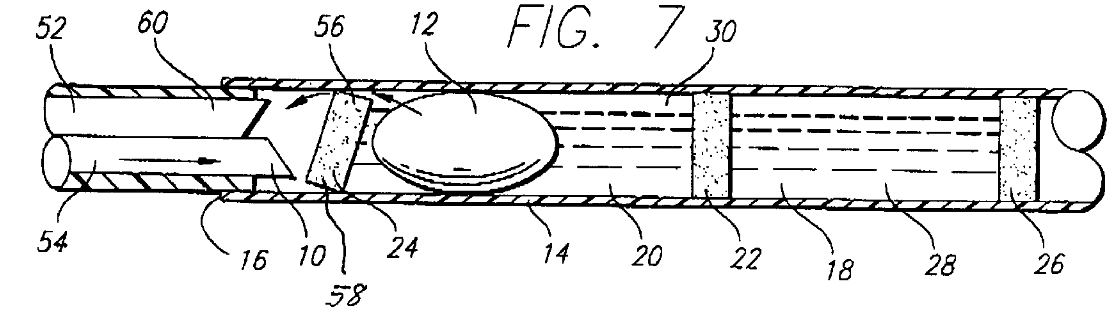
FIG. 7 is a similar view of the insertion of a valve insertion tool in the reagent mixing tube, and the venting of gas from the reagent chamber, in a fourth embodiment of the invention.

As seen in FIG. 7, a fourth embodiment of the valve insertion tool comprises a fourth tool 52, which includes a primary sleeve portion 54 which supports the second valve 24 on one side only, for sealing of a supported side 56 of the second valve 24, and for enabling the venting of the trapped gas 12 through an unsupported side 56 of the second valve 24. A secondary sleeve portion 60 is adapted to be actuated so as to push into place the unsupported side 56 of the second valve 24, to enable sealing of the second reagent 30 in the second chamber 20 only upon final positioning of the second valve 24 in the second chamber 20.

In the operation of the system 10 of the invention, the first valve 22 is inserted in the tube 14 so as to form the first chamber 18 and enclose the first reagent 28 therein. The second valve 24 may then be inserted in the tube 14 so as to form the second chamber 20 and enclose the second reagent 30 therein.

As shown in FIGS. 1–4, in the operation of the first embodiment of the system 10 in accordance with the present invention, the small hollow needle portion 38 of the first tool 32 may be pushed initially through the surface of the first valve 22 and extracted therefrom, and may be pushed subsequently through the second valve 24 and extracted therefrom, without compromising the integrity of the valves. The first valve 22 and the second valve 24 are preferably moderately compliant and display substantial elasticity, so as to enable piercing of the valves and resealing thereof without leaking. In particular, the valve may be inserted in the tube 14 and pushed into position by the head portion 36 of the first tool 32, while the trapped gas 12 is vented through the hollow needle portion 38 of the first tool 32. Also, the chambers may be filled with reagent through a further hollow needle portion (not shown) of the first tool 32. The first tool 32 is thereby adapted to extract the trapped gas 12, and may also fill the chambers with reagent, while preventing reagent from contacting the walls of the tube 14 above the valves, and while minimizing the potential for reagent evaporation.

As seen in FIG. 5, in the operation of the second embodiment of the present invention, the clamp 44 may be installed such that it clamps the first valve 22 around the tube 14 at the contact surface interface thereof. The second chamber 20 may then be filled with the second reagent 30 and the second valve 24 may be inserted in the tube 14 so as to close off the second chamber 20. The trapped gas 12 is compressed until the pressure exerted thereby against the second valve 24 overcomes the seal between the second valve 24 and the tube 44 as the second valve 24 is being inserted in the tube 44. The head portion 42 of the second tool 40 is adapted to be sized and shaped so as to promote the leakage of the trapped gas 12 around the second valve 24 during the insertion thereof.

Referring to FIG. 6, in the operation of the third embodiment of the invention, the enlarged portion 50 of the head section 48 of the third tool 46, which is wider than the outside diameter of the tube 14, may stretch the adjacent portion of the tube 14 beyond the wall of the second valve 24, enabling the trapped gas 12 to escape. In this embodiment, the valve may be rigid or elastic.

As illustrated in FIG. 7, in the operation of the fourth embodiment pursuant to the present invention, the primary sleeve portion 54 supports the second valve 24 on one side 58 only. The unsupported side 56 of the second valve 24 may tend to lag behind the supported side 58 of the second valve 24, due to friction during the insertion process, enabling the trapped gas 12 to escape. Once the second valve 24 is in the desired position, the secondary sleeve portion 60 of the fourth tool 52 may be actuated so as to push the unsupported side 56 of the second value 24 into position to seal the second chamber 20.

The present invention provides improved systems and methods for enabling the venting of gas trapped in a reagent tube during the insertion of the valves therein.

In accordance with the present invention, the improved systems and methods include a system 10 which includes a tube 14, a plurality of valves, such as the first valve 22 and the second valve 24, a plurality of reagents, such as the first reagent 28 and the second reagent 30, and a valve insertion tool, such as the first tool 32, the second tool 40, the third tool 46, or the fourth tool 52.

In the present invention, the valve insertion tools are adapted to interact with the valves, the tube, the reagents, and the trapped gas to enable the efficient and economical venting of the trapped gas from the tube.

Pursuant to the invention, the first tool 32 includes a projecting needle portion adapted to fully penetrate the valves and effectively vent the trapped air. The valve is adapted to reseal, so as to efficiently seal the chamber formed thereby. The first tool 32 may also include a further projecting needle portion, adapted to enable convenient filling of the chamber with the reagent, while minimizing evaporation of the reagent and preventing the reagent from contacting the walls of the tube above the valve.

In the present invention, the second tool 40 includes a head portion reduced in size relative to the size of the valve, so as to effectively enable the venting of the trapped gas around the valve during insertion of the valve.

In accordance with the invention, the third tool 46 includes an enlarged portion 50 of the head portion 48, adapted to be wider than the outside diameter of the tube, so as to actively promote the venting of the trapped gas about the valve and out of the tube.

Pursuant to the present invention, the fourth tool 52 includes a primary sleeve portion 54 for supporting a supported side 58 of the valve, so as to enable the venting of the trapped gas from the tube about the unsupported side 56 of the valve.

In the present invention, the tube 14, and the valves such as first valve 22, and second valve 24, are comprised of materials which are adapted to enable the valves to momentarily deflect upon insertion thereof in the tube 14, to remain in place once inserted in the tube 14 to obstruct the flow of reagents, such as first reagent 28 and second reagent 30, between the chambers, such as first chamber 18 and second chamber 20, and to be readily displaceable with minimum force for enabling separate dispensing or interaction and intermixing of the reagents for use thereof.

It will be apparent from the foregoing that, while particular forms of the invention have been illustrated and described, various modifications can be made without departing from the spirit and scope of the invention. Accordingly, it is not intended that the invention be limited, except as by the appended claims.

What is claimed is:

1. A system for enabling the venting of gas trapped in a substantially vertical tube adapted to enable a chamber to be formed therein upon insertion of a valve for forming the chamber therein, wherein the chamber is adapted to contain a reagent therein, and the reagent in the chamber is adapted to be dispensed, subsequent to being sealed therein, upon displacement of the valve in the tube, comprising:

a tube for containing a reagent therein, and for enabling the dispensing of the reagent therein upon displacement of the valve in the tube, wherein the tube is arranged substantially vertical;

a chamber to be formed in the tube, for sealing the reagent therein pending dispensing of the reagent, including a valve at one end thereof; and means for inserting the valve in the tube, so as to seal the chamber and enclose the reagent therein, and simultaneously to vent gas which may be trapped in the chamber upon insertion of the valve therein, wherein upon removing the inserting means the valve remains within the tube.

2. The system of claim 1, wherein the tube is further adapted to enable a plurality of chambers to be formed therein upon insertion of a plurality of valves for forming the plurality of chambers therein, each of the plurality of chambers is adapted to contain one of a plurality of reagents therein, and the plurality of reagents in the plurality of chambers are adapted to be separately dispensed or mixed so as to interact, upon displacement of each of the plurality of valves in the tube, subsequent to the plurality of reagents being sealed in the plurality of chambers.

3. The system of claim 1, wherein the inserting means comprise a valve insertion tool, including a needle projecting from one end thereof, adapted to be inserted in and removed from the valve, and to enable the venting of trapped gas therethrough, and wherein the valve is comprised of a material adapted to reseal the opening in the valve formed by insertion of the needle therethrough upon removal of the needle therefrom.

4. The system of claim 1, wherein the inserting means further comprise means for enabling the filling of the chamber with the reagent.

5. The system of claim 1, wherein the inserting means comprise a valve insertion tool, adapted to enable the venting of trapped gas around the perimeter of the valve during insertion of the valve.

6. The system of claim 1, wherein the inserting means comprise a valve insertion tool, adapted to enable sealing of the reagent in the chamber only upon final positioning of the valve in the chamber.

7. The system of claim 1, wherein the inserting means comprise a valve insertion tool, including an end portion oversized relative to the outside diameter of the valve, such that upon insertion of the valve, the sealing surface of the tube adjacent the insertion tool oversized end portion is stretched beyond the valve outer wall to enable the venting of the trapped gas.

8. The system of claim 1, wherein the valve is comprised of a relatively flexible material.

9. The system of claim 1, wherein the valve is comprised of a relatively rigid material.

10. The system of claim 1, wherein the tube is comprised of a relatively flexible material.

11. The system of claim 1, wherein the tube is comprised of a relatively rigid material.

12. The system of claim 1, wherein the tube includes a closed end and an open end.

13. The system of claim 1, wherein the tube includes a pair of opposed open ends.

14. The system of claim 3, wherein the inserting means further comprise means for enabling the filling of the chamber with the reagent, comprising a second needle, projecting from the end thereof.

15. The system of claim 3, wherein the valve material is adapted to reseal the opening formed by insertion of the projecting needle therethrough, upon removal of the projecting needle from the valve.

16. The system of claim 5, wherein the valve includes a contact surface interface with the tube at the perimeter of the valve, further comprising means for clamping the valve contact surface interface.

17. The system of claim 6, wherein the valve insertion tool includes a primary sleeve portion adapted to support the valve on one side only, for sealing the supported side of the valve, such that the unsupported side of the valve is adapted to vent the trapped gas.

18. The system of claim 8, wherein the tube is comprised of an elastic material.

19. The system of claim 11, wherein the walls of the tube are substantially thin relative to the diameter of the tube.

20. The system of claim 11, wherein the tube material comprises polypropylene.

21. The system of claim 11, wherein the tube material comprises burate.

22. The system of claim 11, wherein the tube material comprises polyethylene.

23. The system of claim 17, wherein the valve insertion tool further comprises a secondary sleeve portion, adapted to enable sealing of the unsupported side of the valve.

24. The system of claim 18, wherein the valve elastic material comprises a moderate durometer.

25. The system of claim 24, wherein the moderate durometer comprises 85 shore A.

26. A method of enabling the venting of gas trapped in a substantially vertical tube adapted to enable a chamber to be formed therein upon insertion of a valve for forming the chamber therein, wherein the chamber is adapted to contain a reagent therein, and the reagent in the chamber is adapted to be dispensed subsequent to being sealed therein, upon displacement of the valve in the tube, in a system which comprises a substantially vertical tube for containing a reagent therein, and for enabling the dispensing of the reagent therein upon displacement of the valve in the tube, a chamber to be formed in the tube, for sealing the reagent therein pending dispensing of the reagent, including a valve at one end thereof, and means for inserting the valve in the tube, so as to seal the chamber and enclose the reagent therein, and simultaneously vent gas which may be trapped in the chamber upon insertion of the valve therein, wherein upon removing the inserting means the valve remains within the tube, wherein the method comprises the steps of:

containing the reagent in the chamber to be formed in the tube, including inserting the valve in the tube so as to seal the chamber and enclose the reagent therein; and venting the gas trapped in the tube.

27. The method of claim 26, wherein the tube is further adapted to enable a plurality of chambers to be formed therein upon insertion of a plurality of valves for forming the plurality of chambers therein, each of the plurality of chambers is adapted to contain one of a plurality of reagents therein, and the plurality of reagents in the plurality of chambers are adapted to be separately dispensed or mixed so as to interact upon displacement of each of the plurality of valves in the tube, subsequent to the plurality of reagents being sealed in the plurality of chambers, and wherein the containing step further comprises containing each of the plurality of reagents in one of the plurality of chambers to be formed in the tube, including inserting one of the plurality of valves in the tube so as to seal one of the plurality of chambers and enclose one of the plurality of reagents therein, and the venting step further comprises venting the gas trapped in one of the plurality of chambers in the tube.

28. The method of claim 26, wherein the inserting means comprise a valve insertion tool, including a needle projecting from one end thereof, adapted to be inserted in and removed from the valve, and to enable the venting of trapped gas therethrough, and wherein the valve is comprised of a material adapted to reseal the opening in the valve formed by insertion of the needle therethrough upon removal of the needle therefrom, and wherein the air venting step comprises inserting the needle projecting from the one end of the valve insertion tool into the valve, venting trapped gas therethrough, and removing the needle from the valve whereupon the valve material reseals the opening in the valve formed by insertion of the needle therethrough.

29. The method of claim 26, wherein the inserting means further comprise means for enabling the filling of the chamber with the reagent, further comprising the step of filling the chamber with the reagent.

30. The method of claim 26, wherein the inserting means comprise a valve insertion tool, adapted to enable the venting of trapped gas around the perimeter of the valve during insertion of the valve, and wherein the gas venting step comprises inserting the valve insertion tool so as to vent gas around the perimeter of the valve.

31. The method of claim 26, wherein the inserting means comprise a valve insertion tool, adapted to enable sealing of the reagent in the chamber only upon final positioning of the valve in the chamber, and wherein the gas venting step comprises inserting the valve insertion tool so as to seal the reagent in the chamber only upon final positioning of the valve in the chamber.

32. The method of claim 26, wherein the inserting means comprise a valve insertion tool, including an end portion oversized relative to the outside diameter of the valve, such that upon insertion of the valve, the sealing surface of the tube adjacent the insertion tool oversized end portion is stretched beyond the valve outer wall to enable the venting of the trapped gas, and wherein the gas venting step comprises stretching the sealing surface of the tube adjacent the insertion tool oversized end portion beyond the valve outer wall.

33. The method of claim 26, wherein the valve is comprised of a relatively flexible material, and wherein the containing step includes inserting the valve comprised of a relatively flexible material in the tube.

34. The method of claim 26, wherein the valve is comprised of a relatively rigid material, and wherein the containing step includes inserting the valve comprised of a relatively rigid material in the tube.

35. The method of claim 26, wherein the tube is comprised of a relatively flexible material, and wherein the containing step includes containing the reagent in the chamber of the tube comprised of a relatively flexible material.

36. The method of claim 26, wherein the tube is comprised of a relatively rigid material, and wherein the containing step includes containing the reagent in the chamber of the tube comprised of a relatively rigid material.

37. The method of claim 26, wherein the tube includes a closed end and an open end, and wherein the containing step includes containing the reagent in the chamber of the tube, wherein one end of the chamber comprises the tube closed end.

38. The method of claim 26, wherein the tube includes a pair of opposed open ends, and wherein the containing step includes containing the reagent in the chamber of the tube, wherein the opposed ends of the tube are open ends.

39. The method of claim 28, wherein the inserting means further comprise means for enabling the filling of the chamber with the reagent, comprising a second needle, projecting from the end thereof, further comprising the step of inserting the needle into the valve, filling the chamber with the reagent through the second needle, and removing the second needle from the valve.

40. The method of claim 28, wherein the valve material is adapted to reseal the opening formed by insertion of the projecting needle therethrough, upon removal of the projecting needle from the valve, further comprising the step of resealing the opening formed by the insertion of the projecting needle through the valve material.

41. The method of claim 30, wherein the valve includes a contact surface interface with the tube at the perimeter of the valve, further comprising means for clamping the valve contact surface interface, further comprising the step of clamping the valve contact surface interface.

42. The method of claim 31, wherein the valve insertion tool includes a primary sleeve portion adapted to support the valve on one side only, for sealing the supported side of the valve, such that the unsupported side of the valve is adapted to vent the trapped gas, further comprising the step of supporting the one side of the valve.

43. The method of claim 36, wherein the tube is comprised of an elastic material, and wherein the containing step includes containing the reagent in the chamber of the tube comprised of an elastic material.

44. The method of claim 36, wherein the walls of the tube are substantially thin relative to the diameter of the tube, and wherein the containing step includes containing the reagent in the chamber of the tube comprised of walls which are substantially thin relative to the diameter thereof.

45. The method of claim 36, wherein the tube material comprises polypropylene, and wherein the containing step includes containing the reagent in the chamber of the tube comprised of polypropylene.

46. The method of claim 36, wherein the tube material comprises burate, and wherein the containing step includes containing the reagent in the chamber of the tube comprised of burate.

47. The method of claim 36, wherein the tube material comprises polyethylene, and wherein the containing step includes containing the reagent in the chamber of the tube comprised of polyethylene.

48. The method of claim 42, wherein the valve insertion tool further comprises a secondary sleeve portion, adapted to enable sealing of the unsupported side of the valve, further comprising sealing the unsupported side of the valve.

49. The method of claim 43, wherein the valve elastic material comprises a moderate durometer, and wherein the containing step includes inserting the valve comprised of an elastic material of moderate durometer in the tube.

50. The method of claim 49, wherein the moderate durometer comprises 85 shore A, and wherein the containing step includes inserting the valve comprised of an elastic material of 85 shore a durometer.

* * * * *